United States Patent
Watari et al.

(10) Patent No.: US 11,143,602 B2
(45) Date of Patent: Oct. 12, 2021

(54) X-RAY IMAGING APPARATUS

(71) Applicant: Shimadzu Corporation, Kyoto (JP)

(72) Inventors: Tomomi Watari, Kyoto (JP); Koji Yoshida, Kyoto (JP); Yoshihiro Atsumi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/532,584

(22) Filed: Aug. 6, 2019

(65) Prior Publication Data
US 2020/0041424 A1 Feb. 6, 2020

(30) Foreign Application Priority Data

Aug. 6, 2018 (JP) .............................. JP2018-147336

(51) Int. Cl.
*G01N 23/04* (2018.01)

(52) U.S. Cl.
CPC ....... *G01N 23/04* (2013.01); *G01N 2223/308* (2013.01); *G01N 2223/406* (2013.01)

(58) Field of Classification Search
CPC ......... G01N 2223/308; G01N 2223/32; G01N 2223/406; G01N 23/04; A61B 6/447; A61B 6/105; A61B 6/025; A61B 6/4429; A61B 6/4452; B25J 18/025
See application file for complete search history.

(56) References Cited

U.S. PATENT DOCUMENTS

| | | | | |
|---|---|---|---|---|
| 3,118,066 A | * | 1/1964 | Thomas | F16M 11/046 378/194 |
| 3,776,500 A | * | 12/1973 | Foderaro | G21K 5/10 248/333 |
| 3,838,286 A | * | 9/1974 | Prendergast | A61B 6/447 378/26 |
| 3,891,856 A | * | 6/1975 | Amor, Jr. | A61B 6/102 378/197 |
| 3,902,070 A | * | 8/1975 | Amor, Jr. | A61B 6/4464 378/194 |
| 3,986,697 A | * | 10/1976 | Amor, Jr. | A61B 6/4464 248/333 |

(Continued)

FOREIGN PATENT DOCUMENTS

JP 2007-244569 A 9/2007

*Primary Examiner* — Dani Fox
*Assistant Examiner* — Soorena Kefayati
(74) *Attorney, Agent, or Firm* — Muir Patent Law, PLLC

(57) ABSTRACT

An X-ray imaging apparatus capable of covering outer peripheral portions of a fixed and moving supporting columns by a cover even when an SID is set to be large in a configuration in which an imaging system is rotated about an axis extending in a horizontal direction. The supporting column mechanism is provided with a fixed supporting column and a moving supporting column. A fixed cover is arranged at the outer peripheral portion of the fixed supporting column. A moving cover which moves together with the moving supporting column is arranged. An intermediate cover movable in the same direction as the moving cover is arranged between the fixed cover and the moving cover. Between the fixed supporting column and the moving cover, a constant force spring as an energizing member for energizing the intermediate cover to the side of the fixed cover is arranged.

9 Claims, 7 Drawing Sheets

(56) References Cited

U.S. PATENT DOCUMENTS

| | | | | |
|---|---|---|---|---|
| 4,041,320 A * | 8/1977 | Amor, Jr. | A61B 6/4464 | 378/194 |
| 4,057,891 A * | 11/1977 | Amor, Jr. | A61B 6/4464 | 29/434 |
| 4,501,011 A * | 2/1985 | Hauck | A61B 6/4464 | 378/190 |
| 4,677,273 A * | 6/1987 | Colegrove | B23K 15/00 | 219/121.13 |
| 4,901,339 A * | 2/1990 | Heinz | F16M 11/18 | 248/332 |
| 5,023,899 A * | 6/1991 | Ohlson | A61B 6/022 | 378/177 |
| 5,240,218 A * | 8/1993 | Dye | A61B 6/4464 | 248/330.1 |
| 5,348,014 A * | 9/1994 | Okado | A61B 5/6843 | 600/441 |
| 5,419,324 A * | 5/1995 | Dillow | A61B 6/12 | 378/163 |
| 5,538,214 A * | 7/1996 | Sinila | F16M 11/2092 | 248/278.1 |
| 5,751,788 A * | 5/1998 | Khutoryansky | A61B 6/547 | 378/197 |
| 6,193,415 B1 * | 2/2001 | Kadowaki | A61B 6/4405 | 378/197 |
| 6,899,459 B1 * | 5/2005 | McKenna | A61B 6/04 | 378/177 |
| 8,155,266 B2 * | 4/2012 | Masuo | A61B 6/4441 | 378/42 |
| 8,672,543 B2 * | 3/2014 | Kralles | A61B 6/4405 | 378/198 |
| 2002/0006184 A1 * | 1/2002 | Katoh | A61B 6/4429 | 378/196 |
| 2002/0051517 A1 * | 5/2002 | Schwieker | A61B 6/4429 | 378/196 |
| 2002/0141539 A1 * | 10/2002 | Iinuma | A61B 6/4429 | 378/196 |
| 2003/0190014 A1 * | 10/2003 | Nakagawa | A61B 6/4405 | 378/193 |
| 2006/0071138 A1 * | 4/2006 | Steger | A61B 6/4464 | 248/317 |
| 2006/0109955 A1 * | 5/2006 | Boomgaarden | A61B 6/4464 | 378/197 |
| 2006/0159229 A1 * | 7/2006 | Bowen | G01N 23/207 | 378/197 |
| 2010/0020939 A1 * | 1/2010 | Yoshida | A61B 6/04 | 378/197 |
| 2010/0183215 A1 * | 7/2010 | Sakai | A61B 6/4476 | 382/132 |
| 2011/0249807 A1 * | 10/2011 | Dirisio | A61B 6/447 | 378/198 |
| 2011/0311031 A1 * | 12/2011 | Yoshida | A61B 6/0487 | 378/197 |
| 2012/0207281 A1 * | 8/2012 | Kim | A61B 6/4452 | 378/194 |
| 2012/0219121 A1 * | 8/2012 | Simmons | A61B 6/4405 | 378/198 |
| 2013/0077765 A1 * | 3/2013 | Welsh | A61B 6/588 | 378/198 |
| 2013/0129048 A1 * | 5/2013 | Chicchetti | A61B 6/4405 | 378/62 |
| 2013/0235983 A1 * | 9/2013 | Okuno | A61B 6/4464 | 378/197 |
| 2015/0085991 A1 * | 3/2015 | Futterer | A61B 6/4464 | 378/193 |
| 2015/0351708 A1 * | 12/2015 | Tanaka | A61B 6/10 | 378/69 |
| 2018/0312378 A1 * | 11/2018 | Jakober | F16B 7/14 | |
| 2020/0069269 A1 * | 3/2020 | Han | G01N 23/04 | |

* cited by examiner

X-RAY IMAGING APPARATUS

TECHNICAL FIELD

The present invention relates to an X-ray imaging apparatus capable of changing a distance between an X-ray tube and a top board capable of placing a subject thereon.

BACKGROUND ART

As such an X-ray imaging apparatus, there is an apparatus called a fluoroscopic imaging table. Such an X-ray imaging apparatus is provided with an imaging system having an X-ray tube supported by an X-ray tube support mechanism and an X-ray detector for detecting X-rays emitted from the X-ray tube and passed through the subject, a top board arranged between the X-ray tube and the X-ray detector and configured to place the subject on the surface, an X-ray tube moving mechanism configured to change the distance between the X-ray tube and the top board by moving the X-ray tube supported by the support mechanism, and a rotation mechanism configured to rotate the imaging system and the top board in synchronization with each other about an axis extending in the horizontal direction.

In such an X-ray imaging apparatus, when moving the X-ray tube with respect to the top board to change the SID (Source Image receptor Distance), the X-ray tube is moved along the support mechanism that constitutes the support mechanism of the X-ray tube. That is, the supporting column mechanism is provided with a fixed supporting column and a moving supporting column, and is configured to move the X-ray tube by moving the moving supporting column with respect to the fixed supporting column. The moving supporting column and the fixed supporting column are configured such that the outer peripheral portions thereof are covered by a cover in order to secure the appearance or safety.

Patent Document 1 discloses a configuration in which a nested (telescopic) structure is adopted as a suspension holding mechanism in an X-ray imaging apparatus provided with a suspension holding mechanism that suspends an X-ray tube from a ceiling.

PRIOR ART

Patent Document

Patent Document 1: Japanese Unexamined Patent Application Publication No. 2007-244569

SUMMARY OF THE INVENTION

Problems to be Solved by the Invention

In the case of adopting a configuration in which a fixed cover is arranged at an outer peripheral portion of a fixed supporting column and a moving cover configured to be moved together with a moving supporting column is arranged at the outer peripheral portion of the moving supporting column, when the moving supporting column is moved largely in order to set the SID to be large, a gap is generated between the moving cover and the fixed cover unless the moving cover is also increased in size. On the other hand, when the moving cover is increased in size, the moving region of the moving supporting column is restricted, and the moving supporting column cannot be moved sufficiently. For example, even when trying to lower the moving supporting column, there arises a problem that the amount of lowering is restricted.

The present invention has been made to solve the above problems, and aims to provide an X-ray imaging apparatus capable of covering outer peripheral portions of a fixed supporting column and a moving supporting column by a cover even when an SID is set to be large in a configuration in which an imaging system including an X-ray tube is rotated about an axis extending in the horizontal direction.

Means for Solving the Problems

According to the invention as recited in claim 1, an X-ray imaging apparatus includes: an imaging system including an X-ray tube supported by a support mechanism and an X-ray detector for detecting X-rays emitted from the X-ray tube and passed through a subject; a top board arranged between the X-ray tube and the X-ray detector and capable of placing the subject on a surface; an X-ray tube moving mechanism configured to change a distance between the X-ray tube and the top board by moving the X-ray tube supported by the support mechanism; and a rotation mechanism configured to rotate the imaging system and the top board in synchronization with each other about an axis extending in a horizontal direction, wherein the support mechanism includes: a fixed supporting column; a moving supporting column movable with respect to the fixed supporting column; a fixed cover that covers the fixed supporting column; a moving cover that covers the moving supporting column and moves together with the moving supporting column; an intermediate cover arranged between the fixed cover and the moving cover and movable in a same direction as the moving cover; a first engagement member arranged near an end portion of the moving cover on a side of the fixed cover and configured to move the intermediate cover in the same direction as a movement direction of the moving cover by being engaged with a second engaging member arranged near an end portion of the intermediate cover on a side of the moving cover; and an energizing member configured to energize the intermediate cover to a side of the fixed cover.

According to the invention as recited in claim 2, in the invention as recited in claim 1, the energizing member is a constant force spring having one end fixed to the intermediate cover and the other end fixed to the fixed supporting column or the fixed cover.

Effects of the Invention

According to the invention as recited in claim 1, since the intermediate cover is arranged between the fixed cover and the moving cover, even when the SID is set to be large, the outer peripheral portions of the fixed supporting column and the moving supporting column can be covered by the cover. At this time, by the action of the energizing member, the positional relationship between the fixed cover, the intermediate cover, and the moving cover can be maintained constant regardless of the posture of the support mechanism.

According to the invention as recited in claim 2, since the constant force spring is used, it becomes possible to prevent for a long time that the energizing force for energizing the intermediate cover to the fixed cover side is reduced.

EMBODIMENTS FOR CARRYING OUT THE INVENTION

Figure 1:
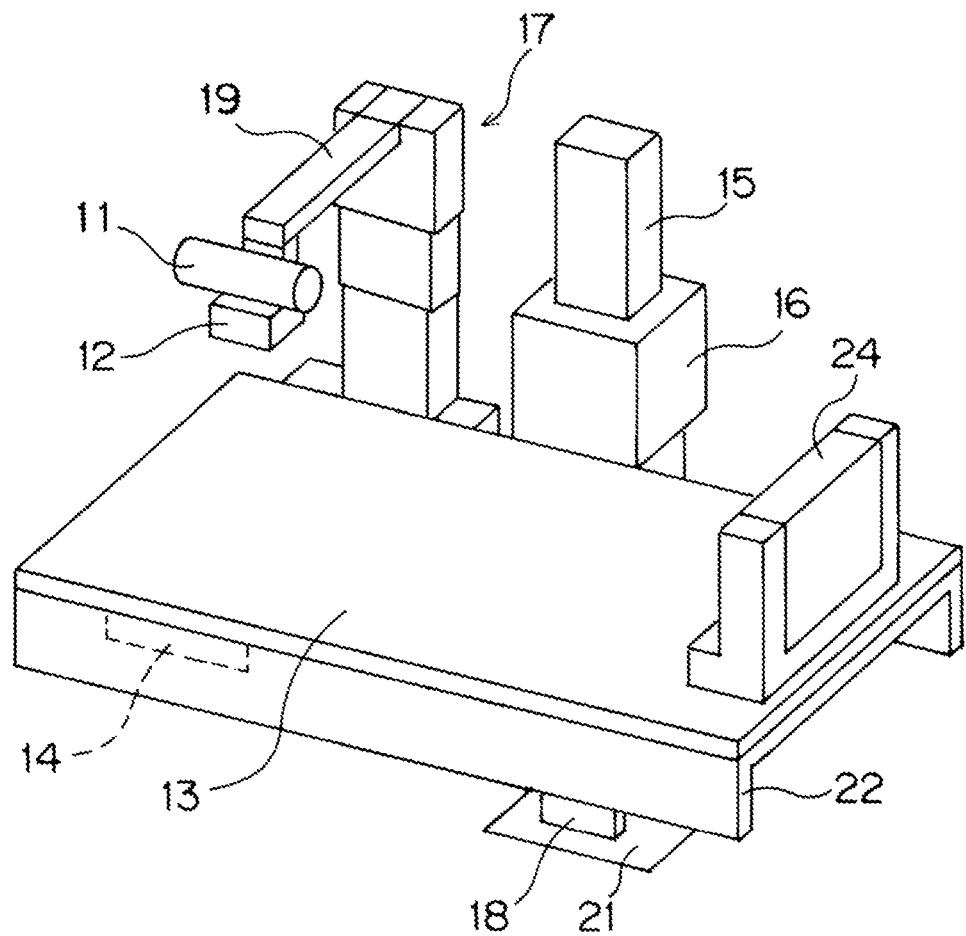
FIG. 1 is a perspective view of an X-ray imaging apparatus according to the present invention.
Figure 2:
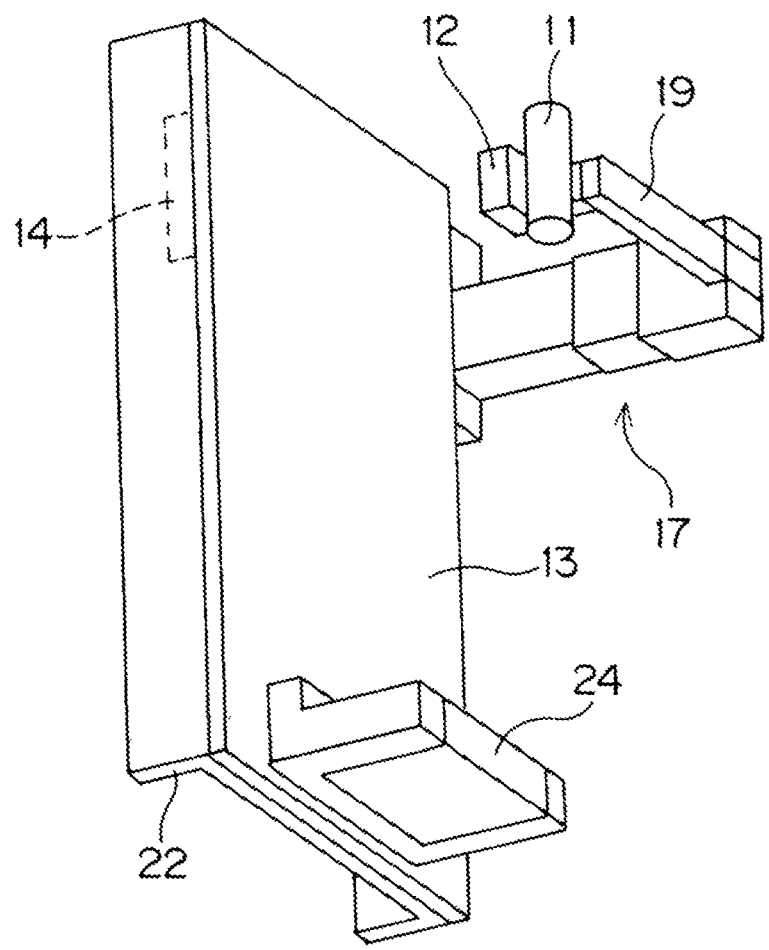
FIG. 2 is a perspective view of the X-ray imaging apparatus according to the present invention.

Hereinafter, embodiments of the present invention will be described with reference to the drawings. FIG. 1 and FIG. 2 each are a perspective view of an X-ray imaging apparatus according to the present invention. Note that FIG. 1 shows a state in which the surface of the top board 13 is arranged so as to be directed in the horizontal direction, and FIG. 2 shows a state in which the surface of the top board 13 is arranged so as to be directed substantially in the vertical direction. Further note that in FIG. 2, illustration of the main support column 15, the holding portion 16, the support portion 18, and the base 21, which will be described later, is omitted.

This X-ray imaging apparatus is provided with a main support column 15 connected to a support portion 18 vertically mounted on a base 21, a holding portion 16 arranged so as to be liftable with respect to the main support column 15, a support frame 22 rotatably connected to the holding portion 16, a top board 13 provided on the support frame 22, a supporting column mechanism 17 connected to an end portion of an arm 19 supporting an X-ray tube 11 and a collimator 12, and an X-ray detector 14, such as, e.g., a flat panel detector, arranged at a position facing the X-ray tube 11 below the surface of the top board 13. On the surface of the top board 13, a step 24 on which a subject stands is provided.

The holding portion 16 is configured to be raised and lowered along the main support column 15. The top board 13 and the support frame 22 are configured to be rotated about an axis orthogonal to the longitudinal direction of the top board 13 and extending in the horizontal direction. The supporting column mechanism 17 and the X-ray detector 14 are configured to be reciprocated in synchronization with each other in the longitudinal direction of the top board 13. Furthermore, the X-ray tube 11 and the collimator 12 are configured to be moved upward and downward along the supporting column mechanism 17 together with the arm 19. The supporting column mechanism 17 is configured to be rotated about an axis orthogonal to the longitudinal direction of the top board 13 and extending in the horizontal direction in synchronization with the top board 13 and the support frame 22. In accordance with the rotation of the supporting column mechanism 17, the imaging system including the X-ray tube 11, the collimator 12, and the X-ray detector 14 is also rotated.

In the X-ray imaging apparatus having the above-described configuration, when performing X-ray fluoroscopy or X-ray imaging on a subject, as shown in FIG. 2, the top board 13 is arranged at a position where the surface of the top board 13 is directed substantially in the vertical direction. At this time, the surface of the top board 13 has an intersection angle of 88 degrees with respect to the horizontal direction. In this state, a subject stands on the step 24 and the top board 13 is inclined at an angle required for X-ray fluoroscopy or X-ray imaging. And, the supporting column mechanism 17 is expanded or contracted to change the distance between the surface of the top board 13 and the X-ray tube 11 and the collimator 12 to thereby set the SID, which is the distance between the focal point of the X-ray tube 11 and the detection surface of the X-ray detector 14.

Figure 3:
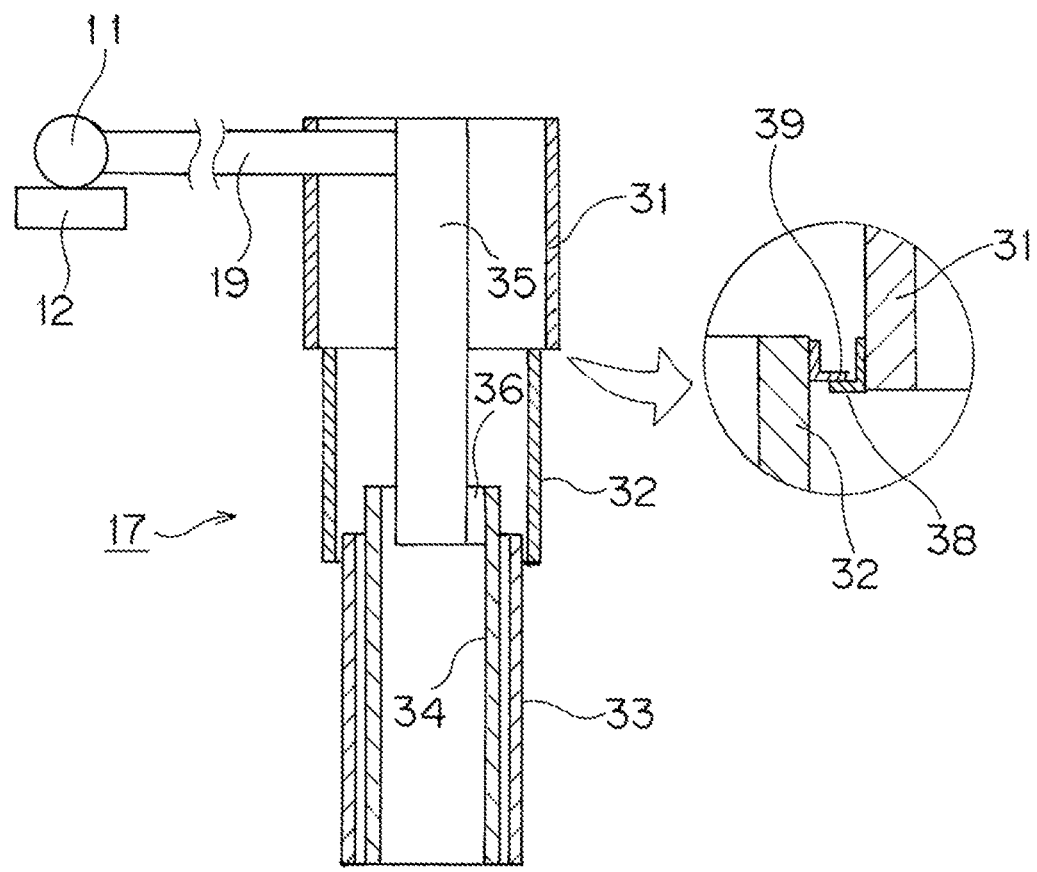
FIG. 3 is a partial cross-sectional schematic view showing a supporting column mechanism 17 together with an X-ray tube 11, a collimator 12, and an arm 19.
Figure 4:
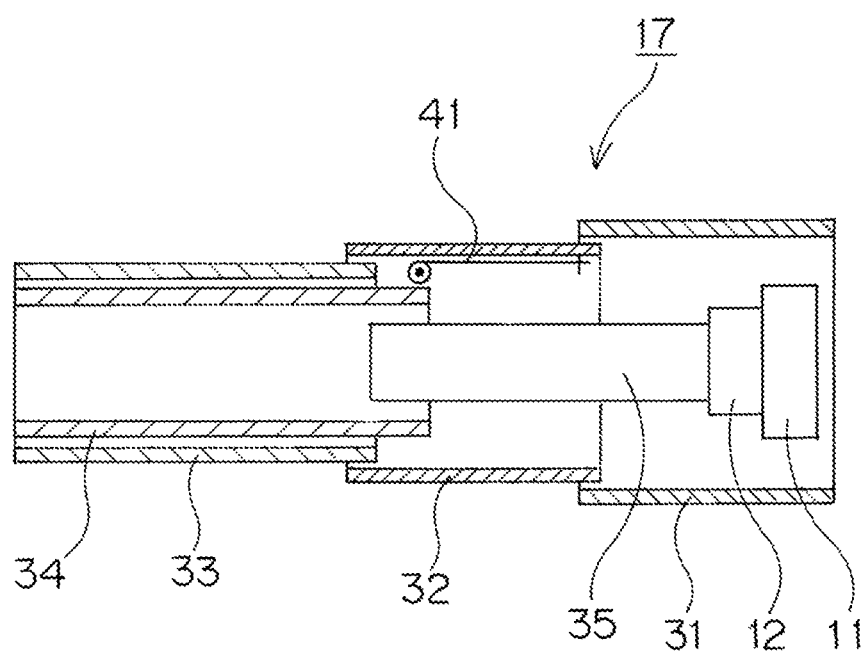
FIG. 4 is a partial cross-sectional schematic view showing the supporting column mechanism 17 together with the X-ray tube 11 and the collimator 12.
Figure 5:
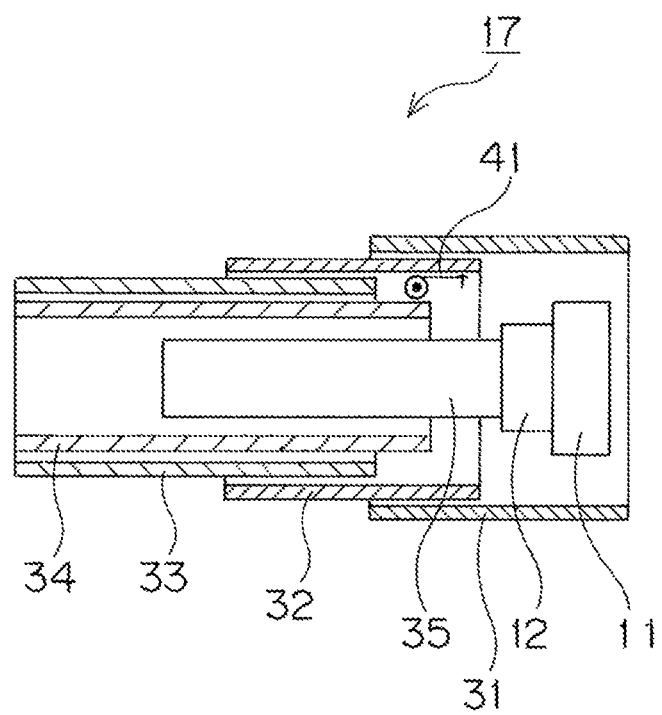
FIG. 5 is a partial cross-sectional schematic view showing the supporting column mechanism 17 together with the X-ray tube 11 and the collimator 12.

Next, the configuration of the supporting column mechanism 17 which is the feature portion of the present invention will be described. FIG. 3 is a partial cross-sectional schematic view showing the supporting column mechanism 17 together with the X-ray tube 11, the collimator 12, and the arm 19. FIG. 4 and FIG. 5 are partial cross-sectional schematic view each showing the supporting column mechanism 17 together with the X-ray tube 11 and the collimator 12. Note that FIG. 3 is a side view of the supporting column mechanism 17, and FIG. 4 and FIG. 5 are front views of the supporting column mechanism 17. Note that FIG. 3 shows the state in which the supporting column mechanism 17 is extending in the vertical direction, and FIG. 4 and FIG. 5 show the state in which the supporting column mechanism 17 is extending in the horizontal direction. Further note that FIG. 3 and FIG. 4 show the state in which the moving cover 31 and the fixed cover 33 are spaced apart from each other, and FIG. 5 shows the state in which the moving cover 31 and the fixed cover 33 are close to each other.

This supporting column mechanism 17 functions as a support mechanism that supports the X-ray tube 11 and the collimator 12 via the arm 19. This supporting column mechanism 17 is provided with a fixed supporting column 34, a moving supporting column 35 capable of moving relative to the fixed supporting column 34, a motor for driving, a rack and pinion mechanism, and a moving mechanism 36 (see FIG. 3) for moving the moving supporting column 35. At the outer peripheral portion of the fixed supporting column 34, a fixed cover 33 is provided. Further, at the outer peripheral portion of the moving supporting column 35, a moving cover 31 which moves together with the moving supporting column 35 is provided. Furthermore, an intermediate cover 32 movable in the same direction as the moving cover 31 is arranged between the fixed cover 33 and the moving cover 31. The moving cover 31, the intermediate cover 32, and the fixed cover 33 constitute a nested (telescopic) structure.

As shown in an enlarged manner in FIG. 3, a first engagement member 38 is provided in the vicinity of the end portion of the moving cover 31 on the fixed cover 33 side. In addition, a second engagement member 39 is provided in the vicinity of the end portion of the intermediate cover 32 on the moving cover 31 side. The first engagement member 38 moves the intermediate cover 32 in the same moving direction as the moving cover 31 by being engaged with the second engagement member 39.

As shown in FIG. 4 and FIG. 5, between the fixed supporting column 34 and the moving cover 31, a constant force spring 41 as an energizing member for energizing the intermediate cover 32 toward the fixed cover 33 side is provided.

Figure 6:
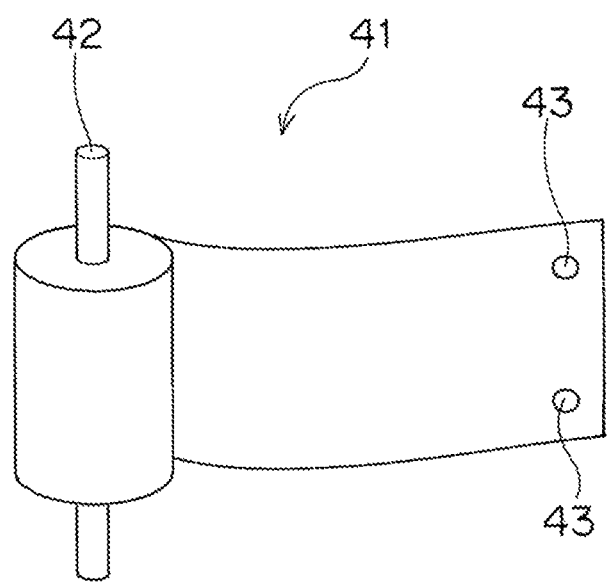
FIG. 6 is a schematic view of a constant force spring 41.

FIG. 6 is a schematic view of the constant force spring 41.

The constant force spring 41 is also called a conston spring ("CONSTON\ コンストン" is a registered trademark of Sanko Spring Co., Ltd.), and has a configuration in which a thin plate-like spring member made of metal is wound around a shaft 42. The constant force spring 41 has a characteristic that its spring force (energizing force) can be maintained for a long period of time.

The shaft 42 of this constant force spring 41 is fixed to the fixed supporting column 34. Further, the tip end portion of the spring member of the constant force spring 41 is fixed to the intermediate cover 32 utilizing holes 43. The intermediate cover 32 is energized toward the fixed cover 33 side by the action of the constant force spring 41. Not that the shaft 42 may be fixed to the fixed cover 33 instead of the fixed supporting column 34. Further note that the constant force spring 41 may be fixed to the moving cover 31 or the fixed supporting column 34 or the fixed cover 33 through another member such as a guide member.

In the supporting column mechanism 17 having such a configuration, when the SID is set to be small and the arm 19 is arranged close to the top board 13 together with the X-ray tube 11 and the collimator 12, as shown in FIG. 5, the moving cover 31, the intermediate cover 32, and the fixed cover 33 having the nested structure overlap each other, resulting in a state in which the moving cover 31 and the fixed cover 33 are close to each other. On the other hand, when the SID is set to be large and the arm 19 is spaced apart from the top board 13 together with the X-ray tube 11 and the collimator 12, as shown in FIG. 3 and FIG. 4, the overlapping of the moving cover 31, the intermediate cover 32, and the fixed cover 33 having the nested structure is reduced, resulting in a state in which the moving cover 31 and the fixed cover 33 are spaced apart from each other. In any of these states, the fixed supporting column 34 and the moving supporting column 35 become a state in which their outer peripheral portions are completely surrounded by the moving cover 31, the intermediate cover 32, and the fixed cover 33.

In the state in which the surface of the top board 13 shown in FIG. 1 is arranged so as to be directed in the horizontal direction, the moving cover 31 tries to move in the direction of the fixed cover 33 by its own weight, but in the state in which the surface of the top board 13 shown in FIG. 2 is directed approximately in the vertical direction, there is no such effect. However, in the supporting column mechanism 17, the constant force spring 41 as an energizing member for energizing the intermediate cover 32 toward the fixed cover 33 side is provided between the fixed supporting column 34 and the moving cover 31. For this reason, it is possible to prevent any movements of the intermediate cover 32 even when the supporting column mechanism 17 is directed in the horizontal direction.

Figure 7:
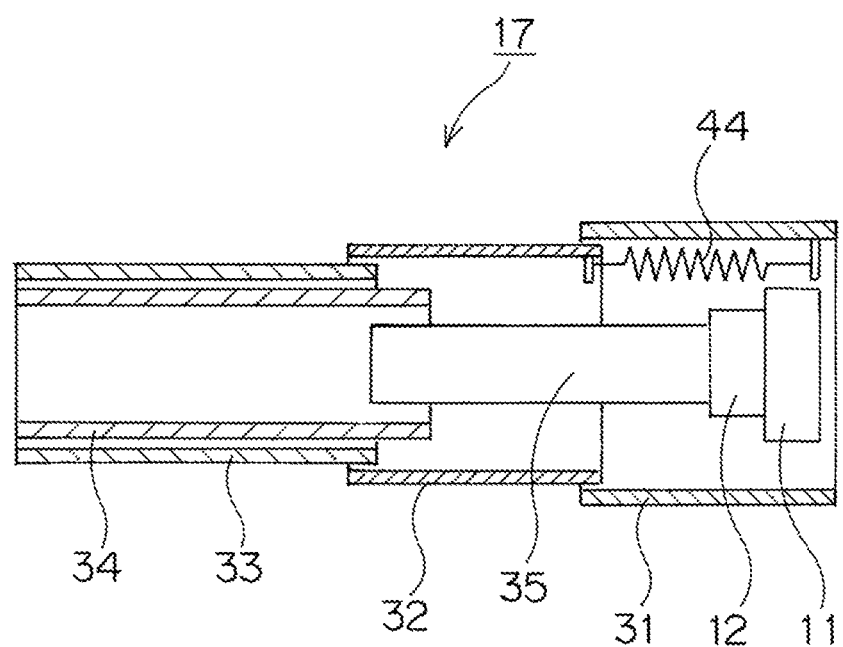
FIG. 7 is a partial cross-sectional schematic view showing the supporting column mechanism 17 according to a second embodiment together with an X-ray tube 11 and a collimator 12.

Next, another embodiment of the present invention will be described. FIG. 7 is a partial cross-sectional schematic view showing a supporting column mechanism 17 according to a second embodiment together with an X-ray tube 11 and a collimator 12. Note that as for the member similar to the supporting column mechanism 17 shown in FIG. 4, the same reference symbol is allocated and the detailed description will be omitted.

In the embodiment shown in FIG. 4, a constant force spring 41 is used as an energizing member for energizing the intermediate cover 32 toward the fixed cover 33 side. In contrast, in this embodiment, a coil spring 44 is used instead of the constant force spring 41.

That is, in this embodiment, a coil spring 44 for energizing the intermediate cover 32 toward the fixed cover 33 side is provided so as to bridge the moving cover 31 and the intermediate cover 32. Even in the case of adopting such a configuration, it is possible to prevent any movements of the intermediate cover 32 even when the supporting column mechanism 17 is directed in the horizontal direction.

As the energizing member according to the present invention which energizes the intermediate cover 32 toward the fixed cover 33 side, in the first embodiment described above, the constant force spring 41 having one end fixed to the intermediate cover 32 and the other end fixed to the fixed supporting column 34 or the fixed cover 33 is adopted, and in the second embodiment, the coil spring 44 for energizing the intermediate cover 32 toward the fixed cover 33 side is adopted. However, as the energizing member according to the present invention, as long as the intermediate cover 32 can be energized toward the fixed cover 33 side, not only the spring but also various other mechanisms can be adopted.

DESCRIPTION OF REFERENCE SYMBOLS

11: X-ray tube
12: collimator
13: top board
14: X-ray detector
15: main support column
16: holding portion
17: supporting column mechanism
18: support portion
19: arm
21: base
31: moving cover
32: intermediate cover
33: fixed cover
34: fixed supporting column
35: moving supporting column
36: moving mechanism
41: constant force spring
44: coil spring

The invention claimed is:

1. An X-ray imaging apparatus comprising:
   an imaging system including an X-ray tube supported by a support mechanism and an X-ray detector for detecting X-rays emitted from the X-ray tube and passed through a subject;
   a top board arranged between the X-ray tube and the X-ray detector and capable of placing the subject on a surface;
   an X-ray tube moving mechanism configured to change a distance between the X-ray tube and the top board by moving the X-ray tube supported by the support mechanism; and
   a rotation mechanism configured to rotate the imaging system and the top board in synchronization with each other about an axis extending in a horizontal direction,
   wherein the support mechanism includes:
      a fixed supporting column; and
      a moving supporting column movable with respect to the fixed supporting column;
      a fixed cover that covers the fixed supporting column;
      a moving cover that covers the moving supporting column and moves together with the moving supporting column;
      an intermediate cover arranged between the fixed cover and the moving cover and movable in a same direction as the moving cover;
      a first engagement member arranged near an end portion of the moving cover on a side of the fixed cover and configured to move the intermediate cover in the same direction as a movement direction of the moving cover by being engaged with a second engaging member arranged near an end portion of the intermediate cover on a side of the moving cover; and a spring having a spring force for forcing intermediate cover in the direction of the fixed cover.

2. The X-ray imaging apparatus as recited in claim 1, wherein the spring is a constant force spring having one end fixed to the intermediate cover and an opposite end fixed to the fixed supporting column or the fixed cover.

3. The X-ray imaging apparatus as recited in claim 1, wherein whether in an extended or retracted state, an outer peripheral portion of the fixed supporting column and an outer peripheral portion of the moving supporting column are completely surrounded by the fixed, intermediate and moving covers.

4. The X-ray imaging apparatus as recited in claim 1, further comprising a collimator supported by the support mechanism.

5. The X-ray imaging apparatus as recited in claim 1, wherein the first engagement member is a protrusion extending from the moving cover toward the intermediate cover, and the second engagement member is a protrusion extending from the intermediate cover toward the moving cover.

6. The X-ray imaging apparatus as recited in claim 1, wherein the moving cover, intermediate cover and fixed cover constitute a nested telescopic structure.

7. The X-ray imaging apparatus as recited in claim 3, wherein in the retracted state, the moving cover surrounds the intermediate cover which in turn surrounds the fixed cover.

8. The X-ray imaging apparatus of claim 6, wherein the nested telescopic structure surrounds and covers the fixed and movable support columns.

9. The X-ray imaging apparatus as recited in claim 7, wherein in the retracted state, the fixed cover surrounds the fixed supporting column which in turn surrounds the movable supporting column.

\* \* \* \* \*